United States Patent
Baldwin et al.

(10) Patent No.: US 10,009,184 B1
(45) Date of Patent: *Jun. 26, 2018

(54) METHODS AND APPARATUS FOR CONTROLLING ACCESS TO ENCRYPTED COMPUTER FILES

(71) Applicant: Trend Micro Incorporated, Tokyo (JP)

(72) Inventors: Matthew Graham Baldwin, Sunnyvale, CA (US); Bharath Kumar Chandrasekhar, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 349 days.

This patent is subject to a terminal disclaimer.

(21) Appl. No.: 14/473,817

(22) Filed: Aug. 29, 2014

Related U.S. Application Data

(63) Continuation of application No. 13/194,518, filed on Jul. 29, 2011, now Pat. No. 8,892,875.

(51) Int. Cl.
*H04L 9/32* (2006.01)

(52) U.S. Cl.
CPC .................................. *H04L 9/3268* (2013.01)

(58) Field of Classification Search
CPC . H04L 9/0891; H04L 63/1433; G06F 21/577; G06F 21/6218; G06F 21/6209
USPC ................ 713/165, 188; 380/277; 726/1, 25
See application file for complete search history.

(56) References Cited

U.S. PATENT DOCUMENTS

| | | | | |
|---|---|---|---|---|
| 5,974,517 | A * | 10/1999 | Gaudet | 711/173 |
| 2003/0041259 | A1* | 2/2003 | Vignoles et al. | 713/200 |
| 2003/0055994 | A1* | 3/2003 | Herrmann et al. | 709/229 |
| 2006/0075228 | A1* | 4/2006 | Black | H04L 63/0428 713/167 |
| 2007/0198525 | A1* | 8/2007 | Chatterjee et al. | 707/10 |
| 2007/0277240 | A1* | 11/2007 | Durfee | G06F 21/577 726/24 |
| 2010/0185852 | A1* | 7/2010 | Ogawa et al. | 713/165 |

OTHER PUBLICATIONS

Final office action of U.S. Appl. No. 13/194,518 dated May 6, 2014.*

* cited by examiner

*Primary Examiner* — Matthew T Henning
(74) *Attorney, Agent, or Firm* — Okamoto & Benedicto LLP

(57) ABSTRACT

A server computer provides centralized key management services to several computers having encrypted files or file systems. The server computer receives key requests from the computers. The server computer issues a key to a computer that passes an integrity check. The key is used to unlock an encrypted file or file system in the computer. When the computer fails another integrity check after receiving the key, indicating a change in the security posture of the computer, the server computer may revoke the key automatically or upon receipt of an instruction from a key administrator.

16 Claims, 6 Drawing Sheets

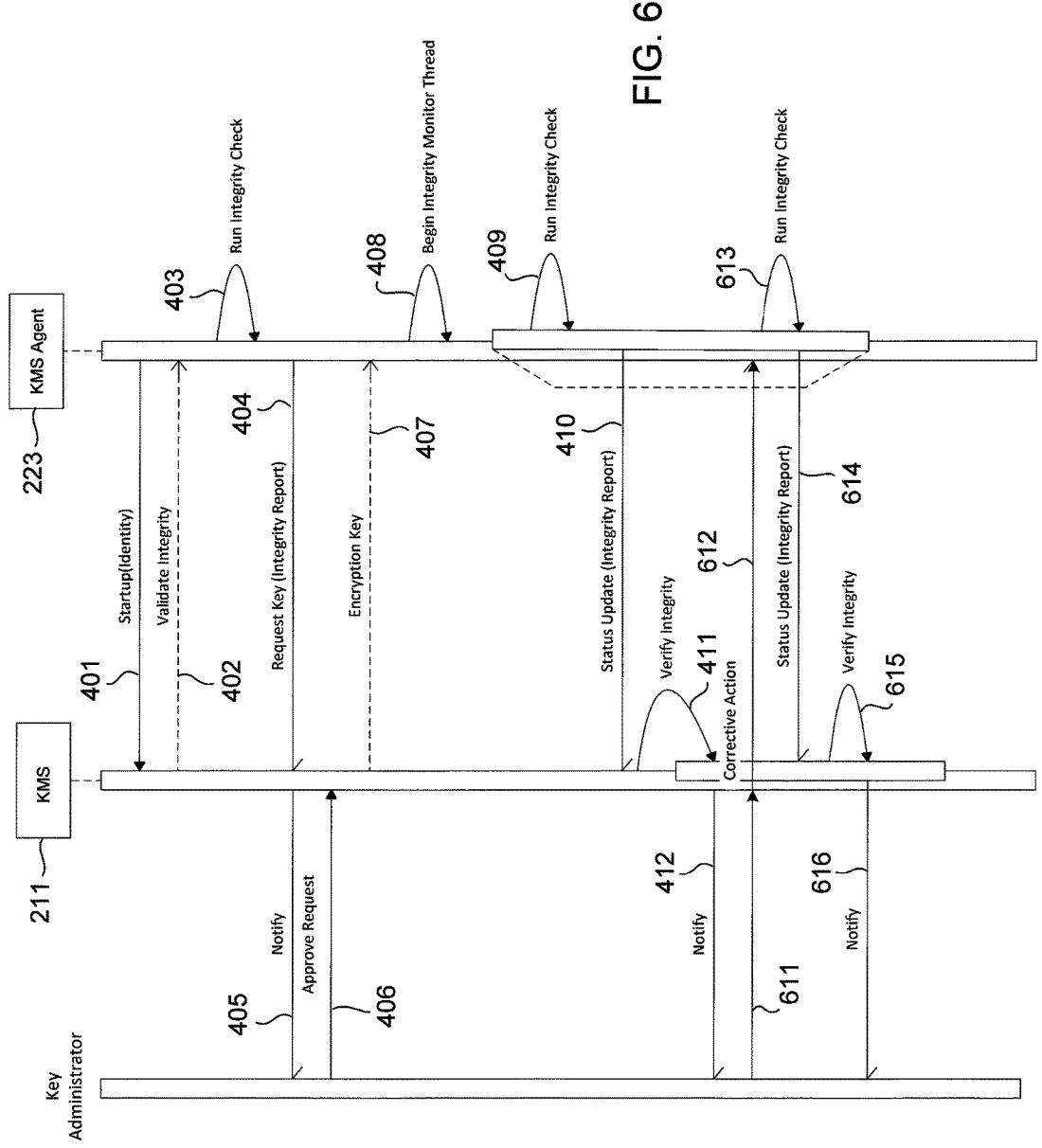

ated drawings and claims.
METHODS AND APPARATUS FOR CONTROLLING ACCESS TO ENCRYPTED COMPUTER FILES

CROSS-REFERENCE TO RELATED APPLICATION

This application is a continuation of U.S. application Ser. No. 13/194,518, filed on Jul. 29, 2011, which is incorporated herein by reference in its entirety.

BACKGROUND OF THE INVENTION

1. Field of the Invention

The present invention relates generally to computer security, and more particularly but not exclusively to encrypted computer files.

2. Description of the Background Art

Some computer files are stored in a computer that is shared with multiple users or accessible over a public computer network. For example, a cloud computing infrastructure, such as that operated by Amazon Web Services™, allows multiple, unrelated customers to operate virtual machines hosted by the same computer hardware infrastructure that is publicly accessible over the Internet and not located in the customer's premises. As another example, a corporate file server that is generally accessible over the corporate network may store files with varying access levels. In both examples (and others as well), there is a danger that a file is accessed by a cyber criminal or an unauthorized user.

SUMMARY

In one embodiment, a method of controlling access to encrypted computer files involves receiving key requests from a plurality of computers, each computer in the plurality of computers having an encrypted file system. A first integrity check is performed in a computer in the plurality of computers, a first result of the first integrity check indicating a security posture of the computer. The first result of the first integrity check is received over a computer network. A key is provided to the computer over the computer network based on the first result of the first integrity check. An encrypted file system in the computer is unlocked using the key. A second integrity check is performed in the computer after receiving the key in the computer. A second result of the second integrity check is received over the computer network. A change in the security of the posture of the computer is detected based on the second result of the second integrity check. In response to detecting the change in the security posture of the computer, the key is revoked to prevent access to the encrypted file system in the computer.

In another embodiment, a system for controlling access to encrypted computer files comprises a plurality of computers having encrypted file systems and a server computer configured to provide centralized key management service to the plurality of computers, the server computer being configured to receive key requests from the plurality of computers, to provide a computer in the plurality of computers that passes an integrity check a key for unlocking an encrypted file system, and to revoke the key to prevent access to the encrypted file system in the computer in response to the computer failing another integrity check subsequent to receiving the key.

In another embodiment, a method of controlling access to encrypted computer files comprises a computer in a plurality of computers receiving over a computer network a key for unlocking an encrypted file, the computer using the key to unlock the encrypted file, the computer performing an integrity check after receiving the key, and a server computer detecting a change in a security of the posture of the computer based on a result of the integrity check, the server computer being configured to communicate with the plurality of computers including the computer over the computer network.

These and other features of the present invention will be readily apparent to persons of ordinary skill in the art upon reading the entirety of this disclosure, which includes the accompanying drawings and claims.

DESCRIPTION OF THE DRAWINGS

FIG. 6 shows a call diagram illustrating manual correction of a computer security posture to prevent key revocation in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Files may be encrypted so that only those with appropriate keys can access them. Commonly-assigned U.S. application Ser. No. 12/565,561, filed on Sep. 23, 2009 discloses a central key management server for storing and providing keys for unlocking encrypted file systems. Although the use of a central key management server is generally effective, a problem may arise after a key has been issued. More particularly, the key management server has no control over the lifecycle of a key because it is relatively difficult to revoke the key after the key has been issued.

Figure 1:
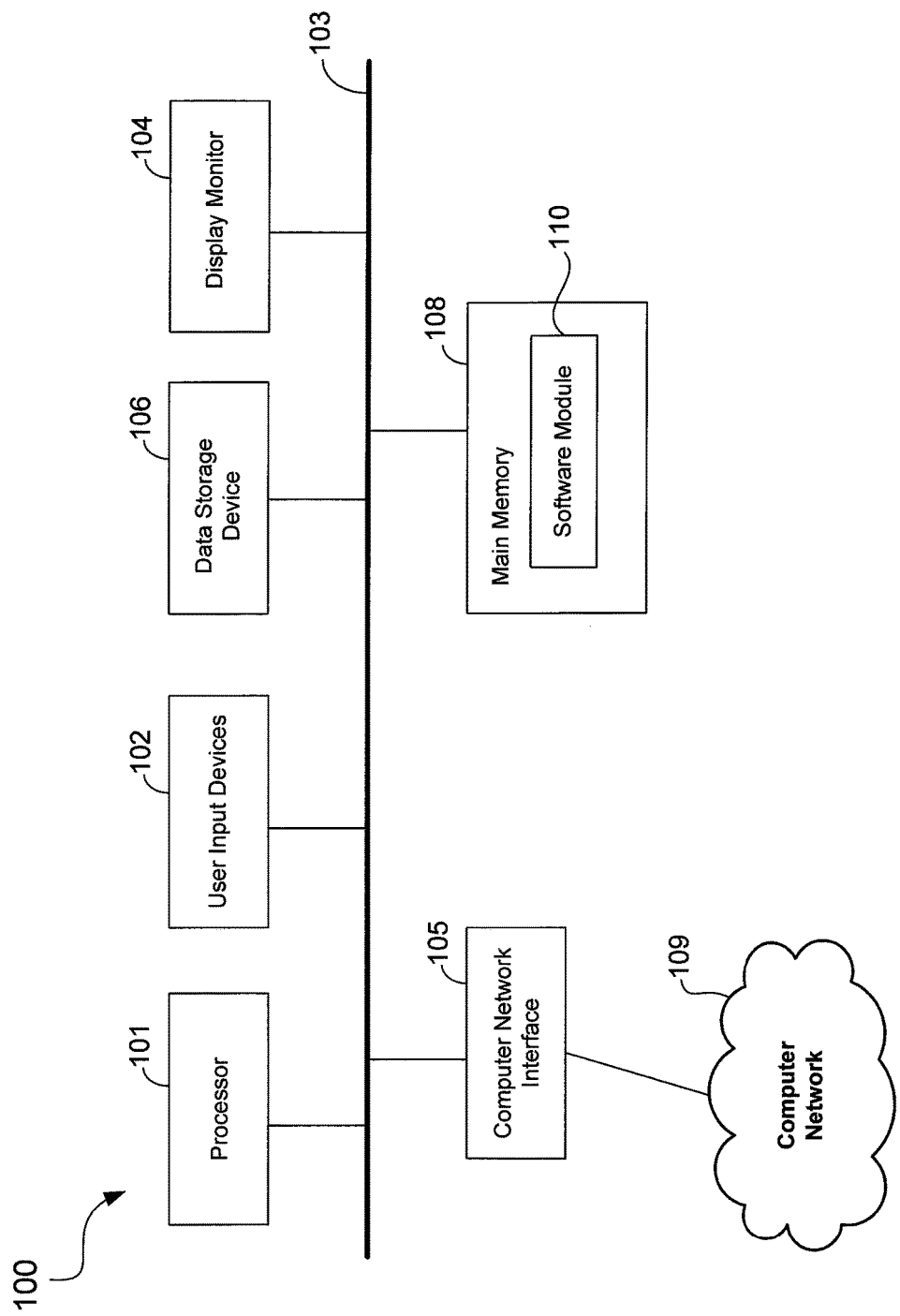
FIG. 1 shows a schematic diagram of a computer in accordance with an embodiment of the present invention.

FIG. 1 shows a schematic diagram of a computer 100 in accordance with an embodiment of the present invention. The computer 100 may be employed as server computer or a client computer, for example. The computer 100 may have fewer or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

The computer 100 may be configured to perform certain functions by programming. In the example of FIG. 1, the computer 100 is a particular machine as programmed with software modules 110. The software modules 110 comprise computer-readable program code stored non-transitory in the main memory 108 for execution by the processor 101. The software modules 110 may be loaded from the data storage device 106 to the main memory 108. The software modules 110 may also be made available in other computer-readable medium including optical disk, flash drive, and other memory device. Using the computers shown in FIG. 2 as an example, the software modules 110 may comprise software modules of a computer 210 or a computer 220.

Figure 2:
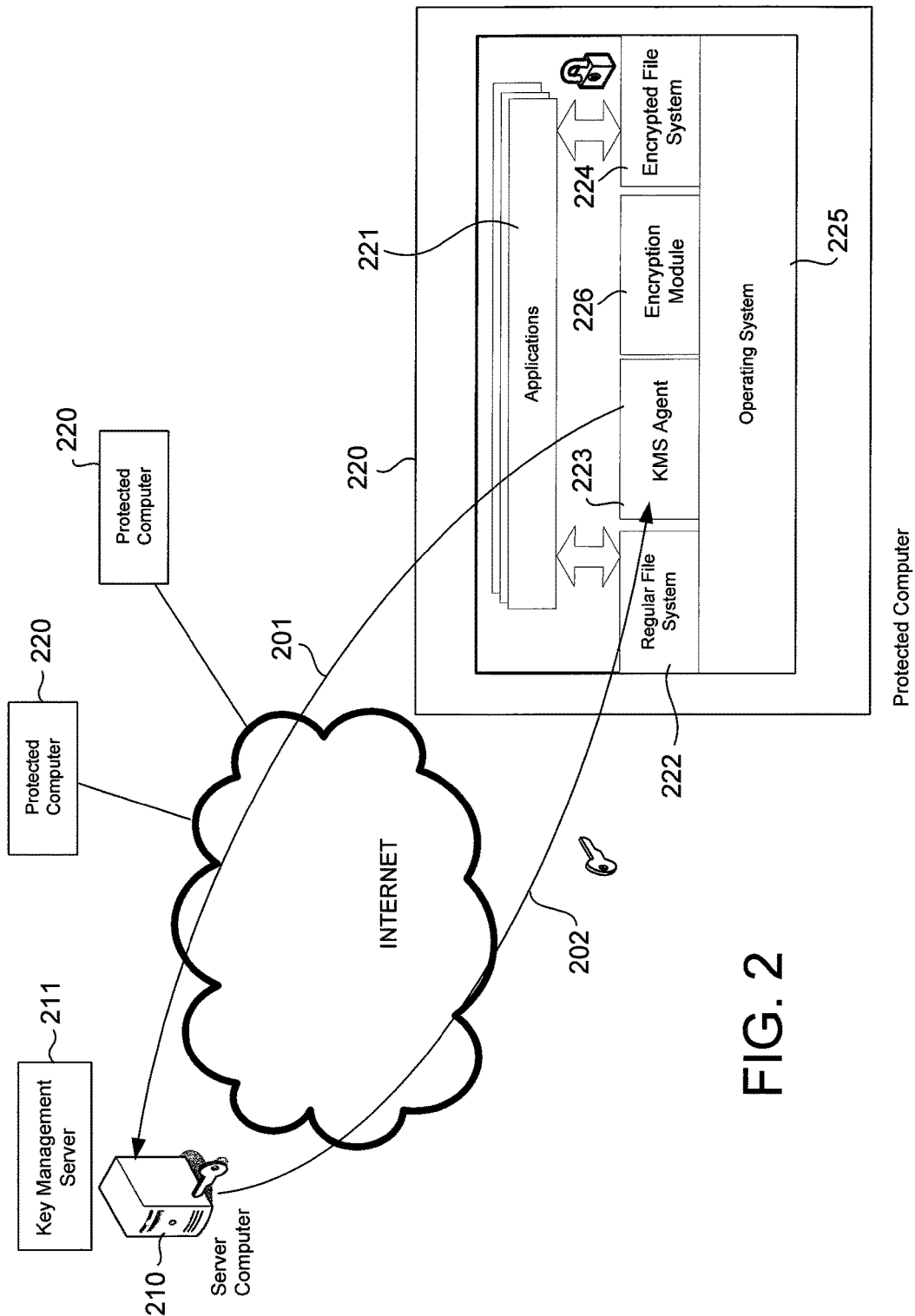
FIG. 2 shows a schematic diagram of a computer system for controlling access to encrypted computer files in accordance with an embodiment of the present invention.

FIG. 2 shows a schematic diagram of a computer system for controlling access to encrypted computer files in accordance with an embodiment of the present invention. In the example of FIG. 2, the system comprises the computer 210 and a plurality of computers 220. The computers 210 and 220 communicate over a computer network, which in the example of FIG. 2 includes the Internet.

The server computer 210 may comprise one or more computers configured to store and provide keys for unlocking secured data in one or more computers 220. Communication with only one computer 220 is shown in FIG. 2 for clarity of illustration. In practice, the server computer 210 provides a centralized key management service to a plurality of computers 220. For example, the server computer 210 may receive and service key requests from a plurality of unrelated computers 220. The server computer 210 may perform its function by executing a key management server 211. The key management server 211 may comprise computer-readable program code for receiving a key request from a KMS agent 223 running in a computer 220, check a result of an integrity check performed on the computer 220, and provide the requested key to the KMS agent 223 when the computer 220 passes the integrity check. In one embodiment, the result of the integrity check indicates the security posture of the computer 220. Passing the integrity check indicates that the security posture of the computer 220 meets computer security policy requirements.

Otherwise, when the protected computer 220 does not pass the integrity check, the key management server 211 may be configured to deny the request. In the event a key has been issued to a computer 220 that subsequently fails an integrity check, the key management server 211 may be configured to revoke the key either manually as instructed by a key administrator or automatically without waiting for an instruction from the key administrator. The key management server 211 may be configured to revoke an issued key by so instructing the KMS agent 223 in the computer 220.

A computer 220, which is also referred to as a "protected computer," may comprise a server computer, a client computer, or a virtual machine having an encrypted file or file system. The computers 220 may be unrelated computers operated by different entities. The computers 220 may be, for example, separate virtual machines in a cloud computing system. In the example of FIG. 2, a protected computer 220 includes an encrypted file system 224. In other embodiments, the protected computer 220 includes a single encrypted file or individually encrypted files instead of an encrypted file system 224. As can be appreciated, the techniques described herein apply to individual files or a file system.

In the example of FIG. 2, the protected computer 220 further comprises one or more applications 221, a regular file system 222, a key management server (KMS) agent 223, an encryption module 226, and an operating system 225.

The operating system 225 may comprise a commercially-available operating system, such as the Microsoft Windows™ or Linux operating system, for example. The regular file system 222 comprises a conventional file system, such as those generally employed by operating systems to store and access files. In contrast, as its name implies, the encrypted file system 224 comprises a file system that is locked by encryption. In the example of FIG. 2, the encrypted file system 224 is encrypted by the encryption module 226. The encryption module 226 may unlock the encrypted file system 224 by decrypting the encrypted file system 224 using the appropriate key. The module 226 may comprise a disk driver, a database filter, or some other software module depending on the application. The module 226 may also be part of the KMS agent 223 or the operating system 225.

Users may store confidential data in the encrypted file system 224 rather than in the regular file system 222. Computer files stored in the encrypted file system 224 cannot be accessed without an appropriate key for unlocking the encrypted file system 224. For example, an application 221 or the operating system 225 cannot access files in the encrypted file system 224 without the corresponding key of the encrypted file system 224. In one embodiment, one or more keys needed to unlock the encrypted file system 224 are not stored in the protected computer 220. Instead, the one or more keys needed to unlock the encrypted file system 224 are remotely located in the server computer 210. This way, theft of the protected computer 220 or unauthorized access to it does not necessarily compromise the contents of the encrypted file system 224. This is particularly advantageous in applications where the protected computer 220 may be accessible to other users or a third-party administrator, such as the case in cloud-based virtual machines or shared server computers.

The KMS agent 223 may comprise computer-readable program code configured to check the integrity of the protected computer 220, obtain a key for unlocking the encrypted file system 224, and revoke the key when instructed by the key management server 211. The KMS agent 223 may revoke a key by informing the encryption module 226 that the key for the encrypted file system 224 is no longer valid. In response, the encryption module 226 may prevent access to the encrypted file system 224. In the example where the encryption module 226 is a disk driver, the encryption module 226 may prevent access to the encrypted file system 224 by dismounting the encrypted file system 224, thereby making the encrypted file system 224 no longer available to calling applications 221. As another example, the encryption module 226 may generate a disk failure event when an application 221 tries to access the encrypted file system 224. The encryption module 226 may also employ other techniques for preventing access to the encrypted file system 224 when the key has been revoked.

The KMS agent 223 may be configured to perform an integrity check by determining the current security posture of the protected computer 220. The security posture is indicative of how secure the protected computer 220 against malicious codes and other computer security threats. Conditions that may affect the security posture of the protected computer 220 include versions and updates to applications, operating system, and antivirus, presence of unauthorized or unwanted software, etc. For example, the KMS agent 223 may perform an integrity check to determine whether the protected computer 220 has updated patches for its applications 221 and operating system 225, a current version and enabled security software (e.g., antivirus, personal firewall), etc. In the case where the protected computer 220 is a virtual machine, the integrity check may also verify the geographic location of the computer hosting the virtual machine. For example, if the virtual machine is not in its predetermined expected geographic location, the KMS agent 223 may deem the virtual machine to be running on a different computer, and accordingly report this finding to the key management server 211. The geographic location of the virtual machine may be determined from its Internet Protocol (IP) address, for example.

The KMS agent 223 may also be configured to provide identity information to the key management server 211. The KMS agent 223 may include the identity information in a key request or in a separate communication to the key management server 211. Before providing the key, the key management server 211 may use the identity information to verify that the protected computer 220 is in a valid state, such as whether or not a virtual machine protected computer 220 is running on its expected cloud computer system. The identity information may include the protected computer 220's IP address, MAC address, and/or other identifying information that can be used to verify that the protected computer 220 is authorized receive a key for unlocking an encrypted file system 224. The identifying information of the protected computer 220 may be provided to the key management server 211 as part of a registration process to subscribe to the central key management service.

The KMS agent 223 may be configured to perform integrity checks when the protected computer 220 boots up and initializes from a reset state (e.g., from a power down, restart, etc.) and/or periodically from time to time. The KMS agent 223 may request the key management server 211 for the key (or keys) for unlocking the encrypted file system 224 (arrow 201). The key request to the key management server 211 may include the results of the integrity checks and identity information of the protected computer 220. To verify the identity of the protected computer 220, the key management server 211 may compare the identity information included in the key request against the identity information registered for the protected computer 220. The key management server 211 may check the results of the integrity checks to determine the security posture of the protected computer 220. If the security posture of the protected computer 220 is compliant (e.g., has the latest patches and updates for its operating system 225, applications 221, and/or security software) and the protected computer 220 is in a valid state (e.g., the key request is from an authorized computer based on the identity information), the key management server 211 provides the KMS agent 223 the key for unlocking the encrypted file system 224 (arrow 202). The KMS agent 223 provides the key to the encryption module 226, which uses the key to unlock the encrypted file system 224.

Figure 3:
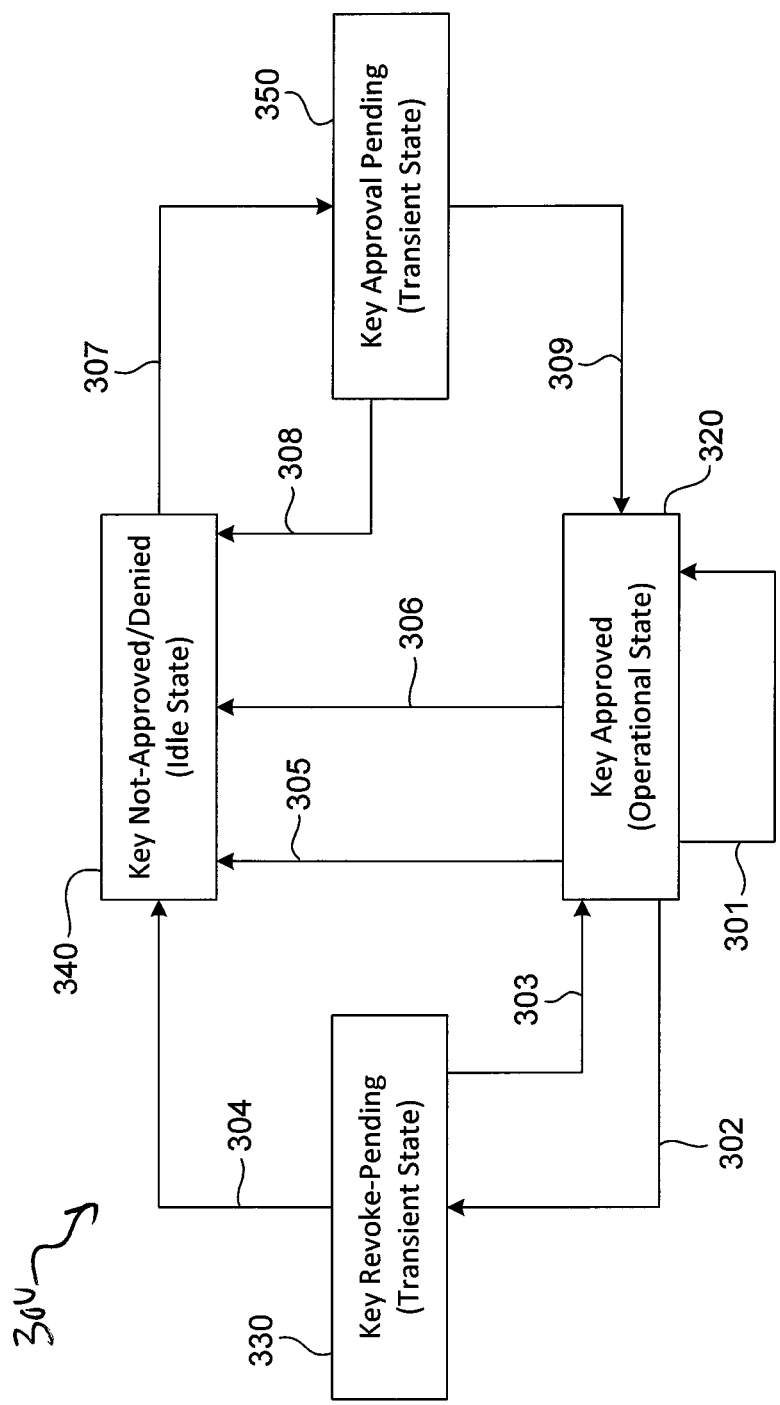
FIG. 3 shows a state diagram illustrating issuance and revocation of a key for unlocking encrypted computer files in accordance with an embodiment of the present invention.

FIG. 3 shows a state diagram 300 illustrating issuance and revocation of a key for unlocking encrypted computer files in accordance with an embodiment of the present invention. In the example of FIG. 3, the state diagram 300 describes issuance and revocation of a key for unlocking the encrypted file system 224. The state diagram 300 may be followed by the server computer 210 as programmed with the key management server 211 and by the protected computer 220 as programmed with the KMS agent 223.

In the example of FIG. 3, the state diagram 300 comprises four states, namely states 350, 320, 330, and 340. The state 350 is a state where approval of a key request is pending. The state 350 is entered when the protected computer 220 sends a key request to the server computer 210. A key request may trigger running an integrity check on the protected computer 220. The result of the integrity check is provided to the server computer 210.

A transition from the state 350 to the state 340 (arrow 308) occurs when the protected computer 220 fails the integrity check. The state 340 is a state where the key request is denied by the server computer 210. As further discussed below, the state 340 is also a state where an issued key has been revoked by the server computer 210.

A transition from the state 350 to the state 320 (arrow 309) occurs when the protected computer 220 passes the integrity check. The state 320 is a state where the key request is approved by the server computer 210. When the protected computer 220 passes the integrity check, the server computer 210 provides the key to the protected computer 220 and sets an integrity check baseline for the protected computer 220. The integrity check baseline may indicate the conditions that resulted in approval of the key request including the security posture of the protected computer 220, such as the version and number of applications 221, the version of the operating system 225, whether the protected computer 220 has updated and enabled security software, etc. The key remains approved so long as the protected computer 220 meets the integrity check baseline conditions (arrow 301). In other words, the key for unlocking the encrypted file system 224 remains valid while the security posture of the protected computer 220 meets computer security policy requirements.

The protected computer 220 may periodically perform integrity checks and forward the results of the integrity checks to the server computer 210. The server computer 210 checks the results of the integrity checks and initiate revocation of any key issued to the protected computer 220 when the protected computer 220 fails an integrity check.

A transition from the state 320 to the state 330 (arrow 302) occurs when an approved (i.e., issued) key is in the process of being revoked. The state 330 is a state where the key revocation is pending. An approved key may be revoked when the protected computer 220 fails an integrity check subsequent to the key being issued to the protected computer 220. For example, the approved key may be revoked in the event of an integrity check baseline mismatch, i.e., when the result of the current integrity check indicates a change from the integrity check baseline. An example integrity check baseline mismatch is when an antivirus that was up-to-date in the integrity check baseline is indicated in the result of the current integrity check to be outdated.

The key administrator may be notified in the event of an integrity check failure. A transition from the state 330 back to the state 320 (arrow 303) occurs when the key administrator performs corrective action to correct the condition that resulted in the integrity check failure. For example, the key administrator may update or initiate updating of an outdated antivirus in the protected computer 220. The integrity check failure may be recorded in an event log. The key administrator may also revoke the approved key, resulting in a transition from the state 330 to the state 340 (arrow 304).

The key is no longer valid, and thus cannot be used to unlock the encrypted file system 224, in the state 340.

The system of FIG. 2 may also be configured to automatically revoke an approved key. For example, the key management server 211 may be set to automatically revoke an approved key when the protected computer 220 fails an integrity check. In that case, a key administrator does not have to take action to revoke an approved key: a transition from the state 320 to the state 340 (arrow 305) automatically occurs in the event of an integrity check failure, revoking the approved key.

A transition from the state 320 to the state 340 (arrow 306) may also occur when the encrypted file system 224 is shutdown, such when the protected computer 220 is being shutdown or a disk dismount or data volume shutdown involving the encrypted file system 224 is performed. In that case, the approved key is reclaimed by the server computer 210 by revoking it. The protected computer 220 may eventually try to get another key approved by requesting for a key and passing an integrity check (arrow 307).

Figure 4:
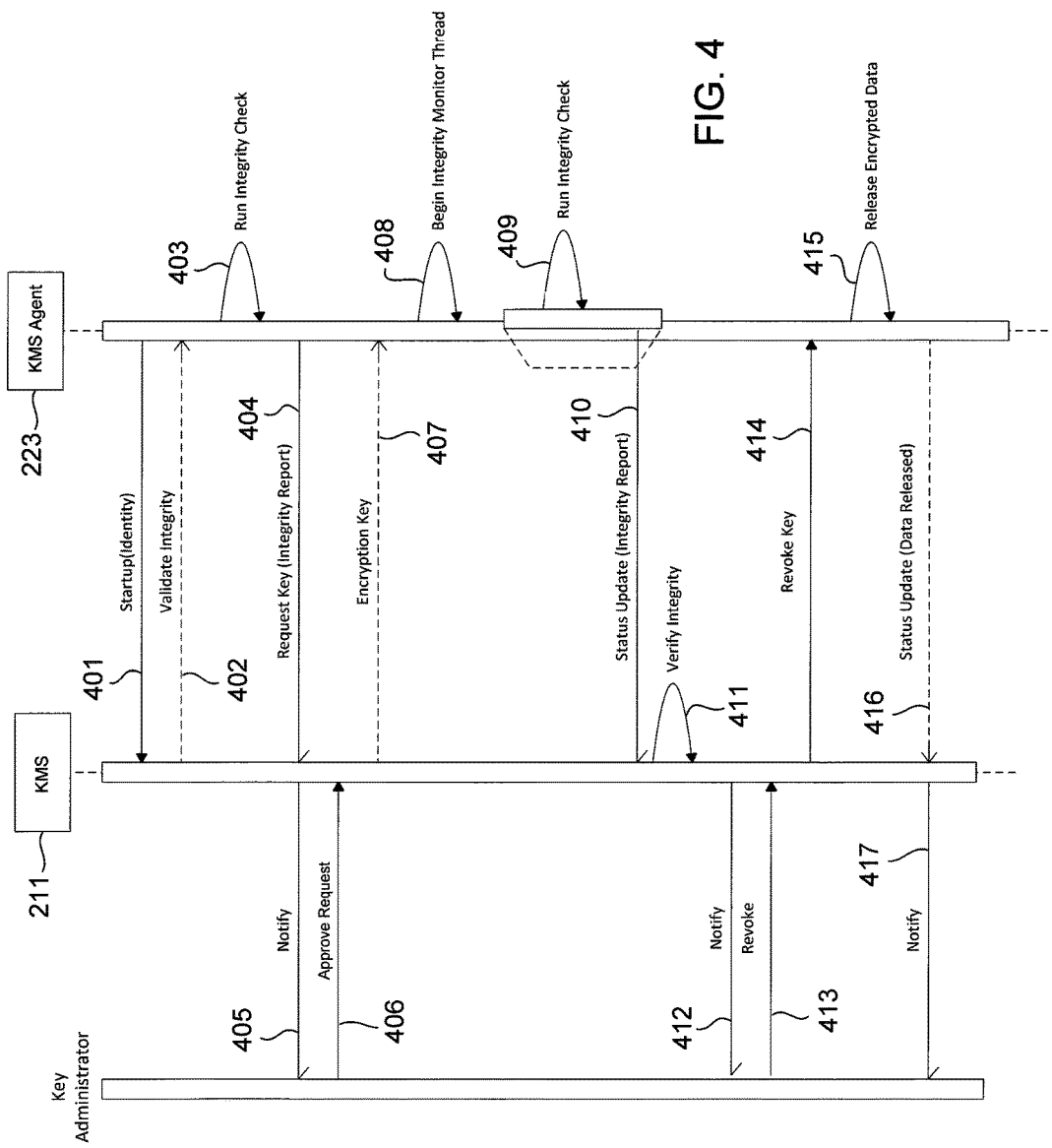
FIG. 4 shows a call diagram illustrating manual revocation of a key for unlocking encrypted computer files in accordance with an embodiment of the present invention.
Figure 5:
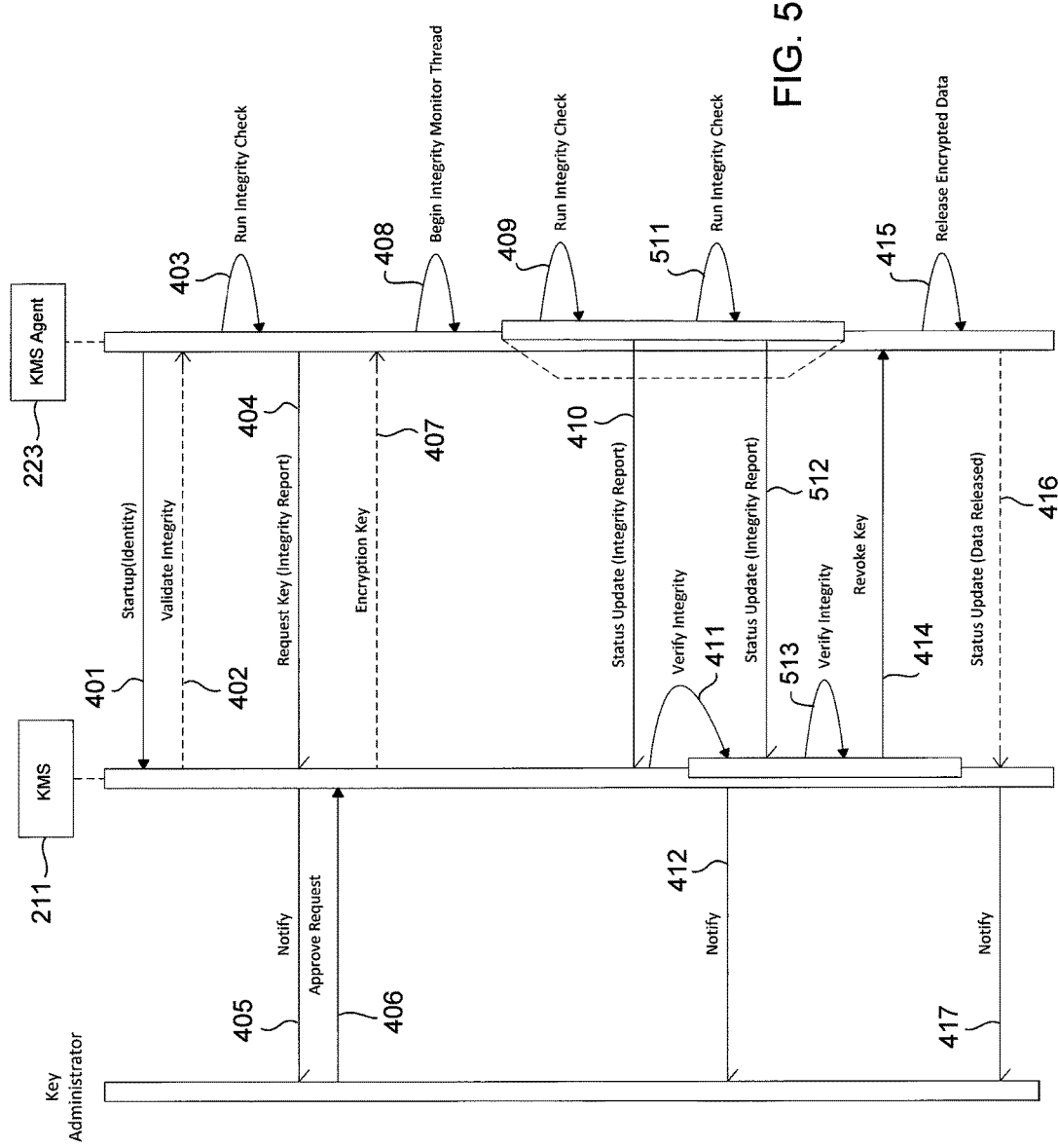
FIG. 5 shows a call diagram illustrating automatic revocation of a key for unlocking encrypted computer files in accordance with an embodiment of the present invention.

FIGS. 4-6 show call diagrams illustrating a method of controlling access to encrypted computer files in accordance with an embodiment of the present invention. The call diagrams of FIGS. 4-6 are explained using the components of FIG. 2 for illustration purposes. The server computer 210 may be configured to perform its actions as programmed with the key management server 211. Similarly, the protected computer 220 may be configured to perform its actions as programmed with the KMS agent 223. In the example of FIGS. 4-6, the key administrator is a person in charge of managing the keys. In other embodiments, the function of the key administrator may be removed (e.g., automatic revocation) or be performed by a script or other program code separate from or part of the key management server 211.

FIG. 4 shows a call diagram illustrating manual revocation of a key for unlocking encrypted computer files in accordance with an embodiment of the present invention. In operation, the KMS agent 223 in the protected computer 220 sends identity information to the key management server 211 in the server computer 210 (arrow 401) when the protected computer 220 starts up. The key management server 211 validates the identity information to ensure that the protected computer 220 is authorized to receive a key for an encrypted file system 224. The key management server 211 then queries the integrity of the protected computer 220 (arrow 402) by asking for the results of an integrity check. The KMS agent 223 performs an integrity check (arrow 403), and sends the key management server 211 a key request (arrow 404) that includes the result of the integrity check. The key management server 211 notifies the key administrator of the key request and the result of the integrity check (arrow 405). Assuming the result of the integrity check is acceptable, e.g., indicates that the security posture of the protected computer 220 satisfies computer security policies, the key administrator approves the key request (arrow 406), resulting in the key management server 211 issuing a key to the KMS agent 223 (arrow 407). The key management server 211 stores the conditions that allowed for issuance of the key as integrity check baseline. In the protected computer 220, the KMS agent 223 uses the key to unlock the encrypted file system 224. In one embodiment, the KMS agent 223 provides the key to the encryption module 226, which in turn decrypts the encrypted file system 224.

After receiving the key, the KMS agent 223 starts an integrity monitor thread (arrow 408) to monitor for changes to the security posture of the protected computer 220. The KMS agent 223 may perform an integrity check (arrow 409) periodically or in response to detecting a change in the security posture of the protected computer 220, such as an antivirus that is no longer up-to-date or a change in any of the conditions that resulted in the key issuance. The KMS agent 223 sends the key management server 211 a status update that includes the result of the most recently performed integrity check (arrow 410). The key management server 211 verifies the integrity of the protected computer 220 (arrow 411) by comparing the result of the integrity check to the integrity check baseline. When the key management server 211 detects an integrity check baseline mismatch, such as when the security posture of the protected computer 220 has changed for the worse, the key management server 211 notifies the key administrator (arrow 412) who may decide to revoke the key by issuing a key revocation instruction (arrow 413) to the key management server 211. In turn, the key management server 211 sends a key revocation instruction to the KMS agent 223 (arrow 414). In other embodiments, the key management server 211 may be configured to automatically revoke the key, i.e., without waiting for an instruction from the key administrator, when the protected computer 220 fails an integrity check.

In response to a key revocation instruction, the KMS agent 223 prevents further access to the encrypted file system 224 (arrow 415) by informing the encryption module 226 that the key for unlocking the encrypted file system 224 is no longer valid. Preventing further access to the encrypted file system 224 is preferably performed in an orderly manner to minimize disruption to legitimate applications 221 that are accessing files in the encrypted file system 224. For example, the encryption module 226 may simulate a disk failure or send a warning message to affected applications 221. The KMS agent 223 reports the revocation of the key to the key management server 211 (arrow 416), which so notifies the key administrator (arrow 417).

FIG. 5 shows a call diagram illustrating automatic revocation of a key for unlocking encrypted computer files in accordance with an embodiment of the present invention. In the call diagram of FIG. 5, the initial actions represented by the arrows 401-412 are the same as in the call diagram of FIG. 4. More specifically, the KMS agent 223 requests and receives a key to unlock the encrypted file system 224 (arrows 401-407). After the key has been received, the KMS agent 223 provides the key management server 211 a status update indicating a failed integrity check (arrows 408-411). The key administrator is notified of the failed integrity check (arrow 412).

In the example of FIG. 5, the key management server 211 is configured to automatically revoke an issued key when the protected computer fails an integrity check without waiting for a key revocation instruction from the key administrator. In one embodiment, the key management server 211 is configured to revoke an issued key when the protected computer 220 fails two integrity checks in a row without the key administrator taking an action to correct the security posture of the protected computer 220. In the example of FIG. 5, the KMS agent 223 re-runs the integrity check (arrow 511) and sends the result of the integrity check to the key management server 211 for verification (arrows 511-513). Because the protected computer 220 still fails the integrity check and the key administrator has not intervened, the key management server 211 revokes the key (arrows 414-417) as previously described with reference to the call diagram of FIG. 4.

FIG. 6 shows a call diagram illustrating manual correction of a computer security posture to prevent key revocation in accordance with an embodiment of the present invention. In the call diagram of FIG. 6, the initial actions represented by the arrows 401-412 are the same as in the call diagram of FIG. 4. More specifically, the KMS agent 223 requests and receives a key to unlock the encrypted file system 224 (arrows 401-407). After the key has been received, the KMS agent 223 provides the key management server 211 a status update indicating a failed integrity check (arrows 408-411). The key administrator is notified of the failed integrity check (arrow 412).

In the example of FIG. 6, automatic key revocation is not set to give the key administrator the option to correct a condition that resulted in the protected computer 220 failing the integrity check (arrow 611). For example, the key administrator may initiate corrective action to update an outdated piece of software or enable a disabled antivirus so that the security posture of the protected computer 220 is in accordance with computer security policies. In that case, the key administrator does not send a revocation instruction and the key thus remains valid for the time being. The key administrator may perform corrective action by sending a corresponding instruction (or instructions) to the key management server 211 (arrow 611), which forwards the instruction to the KMS agent 223 for implementation (arrow 612). For example, the KMS agent 223 may initiate updating of an outdated piece of software or send a message to a user or administrator of the protected computer 220 about the discrepancy in security posture.

After the corrective action has been performed, the KMS agent 223 re-runs the integrity check (arrow 613) and sends the result of the integrity check to the key management server 211 (arrow 614). The key management server 211 verifies the integrity of the protected computer 220 (arrow 615) by comparing the result of the integrity check to the integrity check baseline. This time, because the key administrator has intervened to get the security posture of the protected computer 220 corrected, the protected computer 220 still meets (or exceeds) the conditions that resulted in the key being issued to the protected computer 220. The key administrator is notified that the protected computer 220 now passes the integrity check (arrow 616).

Methods and apparatus for controlling access to encrypted computer files have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of controlling access to encrypted computer files, the method comprising:
    receiving key requests from a plurality of computers, each computer in the plurality of computers having an encrypted file system therein;
    performing a first integrity check in a computer in the plurality of computers, a first result of the first integrity check indicating a security posture of the computer;
    receiving the first result of the first integrity check over a computer network;
    providing a key to the computer based on the first result of the first integrity check, the key being provided to the computer over the computer network;
    unlocking an encrypted file system comprising a plurality of files that are in the computer using the key, the encrypted file system being unlocked locally in the computer;
    performing a second integrity check in the computer after receiving the key in the computer;
    receiving a second result of the second integrity check over the computer network;
    detecting a change in the security posture of the computer based on the second result of the second integrity check; and
    in response to detecting the change in the security posture of the computer, revoking the key to prevent access to the encrypted file system comprising the plurality of files that are in the computer.

2. The method of claim 1 wherein the change in the security posture of the computer comprises an antivirus that is indicated as current in the first result of the first integrity check but is indicated as outdated in the second result of the second integrity check.

3. The method of claim 1 wherein revoking the key to prevent access to the encrypted file system that is in the computer comprises dismounting the encrypted file system comprising the plurality of files that are in the computer.

4. The method of claim 1 wherein the plurality of computers comprises virtual machines.

5. The method of claim 1 wherein revoking the key to prevent access to the encrypted file system comprises:
    informing a key administrator of the change in the security posture of the computer; and
    receiving an instruction from the key administrator to revoke the key.

6. The method of claim 1 wherein revoking the key to prevent access to the encrypted file system comprises:
    automatically revoking the key without waiting for an instruction from a key administrator to revoke the key.

7. The method of claim 1 wherein revoking the key to prevent access to the encrypted file system comprises:
    sending a key revocation instruction to the computer over the computer network; and
    in response to receiving the key revocation instruction in the computer, preventing an application running in the computer from accessing the encrypted file system that is in the computer.

8. The method of claim 1 further comprising:
    prior to performing the first integrity check in the computer, sending over the computer network identity information identifying the computer.

9. A system for controlling access to encrypted computer files, the system comprising:
    a computer in a plurality of computers having encrypted file systems, the computer being configured to perform a first integrity check, to send to a server computer a result of the first integrity check indicating a security posture of the computer, to receive from the server computer a key for unlocking an encrypted file system comprising a plurality of files that are in the computer based on the result of the first integrity check, to unlock the file system locally in the computer, to perform a second integrity check in the computer after receiving the key in the computer, to send to the server computer a result of the second integrity check, and to revoke the key to prevent access to the encrypted file system when the result of the second integrity check indicates a change in the security posture of the computer; and
    the server computer configured to provide centralized key management service to the plurality of computers, the server computer being configured to receive key requests from the plurality of computers, to provide the computer in the plurality of computers the key for unlocking the encrypted file system based on the result of the first integrity check indicating that the computer passes the first integrity check, and to revoke the key to prevent access to the encrypted file system comprising the plurality of files that are in the computer in response to the computer failing another the second integrity check subsequent to receiving the key based on the result of the second integrity check.

10. The system of claim 9 wherein the key is revoked by dismounting the encrypted file system comprising the plurality of files that are in the computer.

11. The system of claim 9 wherein the server computer is configured to revoke the key automatically without waiting for an instruction from a key administrator to revoke the key.

12. A method of controlling access to encrypted computer files, the method comprising:
- a computer in a plurality of computers performing a first integrity check and sending over a computer network a result of the first integrity check, the result of the first integrity check indicating a security posture of the computer;
- the computer in a plurality of computers receiving over the computer network a key for unlocking a plurality of files that are in the computer for passing the first integrity check according to the result of the first integrity check;
- the computer using the key to locally unlock the plurality of encrypted files that are in the computer;
- the computer performing a second integrity check after receiving the key;
- the computer sending a result of the second integrity check over the computer network; and
- the computer locally revoking the key to prevent access to the plurality of encrypted files that are in the computer when the result of the second integrity check indicates a change in the security posture of the computer.

13. The method of claim 12 wherein the change in the security posture of the computer comprises an antivirus that is indicated as current in the result of the first integrity check but is indicated as outdated in the result of the second integrity check.

14. The method of claim 12 wherein the computer revokes the key by receiving over the computer network an instruction to revoke the key, and the computer dismounting an encrypted file system comprising the plurality of files that are in the computer in response to the instruction.

15. The method of claim 12 wherein the plurality of computers comprises virtual machines.

16. The method of claim 12 further comprising:
- notifying a key administrator of the change in the security posture of the computer; and
- keeping the key as valid after the key administrator corrects the security posture of the computer.

* * * * *